US009784598B2

(12) United States Patent
Maeda

(10) Patent No.: US 9,784,598 B2
(45) Date of Patent: Oct. 10, 2017

(54) POSITION DETECTING DEVICE, ELECTRONIC APPARATUS, RECORDING APPARATUS, ROBOT, AND POSITION DETECTING METHOD HAVING A RATIO COMPUTING UNIT

(71) Applicant: SEIKO EPSON CORPORATION, Tokyo (JP)

(72) Inventor: Akitoshi Maeda, Shiojiri (JP)

(73) Assignee: SEIKO EPSON CORPORATION, Tokyo (JP)

(*) Notice: Subject to any disclaimer, the term of this patent is extended or adjusted under 35 U.S.C. 154(b) by 157 days.

(21) Appl. No.: 14/922,627

(22) Filed: Oct. 26, 2015

(65) Prior Publication Data

US 2016/0116307 A1 Apr. 28, 2016

(30) Foreign Application Priority Data

Oct. 27, 2014 (JP) .................................. 2014-218045
Jun. 30, 2015 (JP) .................................. 2015-131531

(51) Int. Cl.
*G01D 5/347* (2006.01)
*G01D 5/34* (2006.01)
*B25J 13/08* (2006.01)

(52) U.S. Cl.
CPC ............ *G01D 5/341* (2013.01); *B25J 13/088* (2013.01); *G01D 5/3473* (2013.01); *Y10S 901/23* (2013.01)

(58) Field of Classification Search
CPC ............... G01D 5/2451; G01D 5/3473; G01D 5/34746; B25J 9/126
USPC .................................. 250/231.13, 221, 214 R
See application file for complete search history.

(56) References Cited

U.S. PATENT DOCUMENTS 6,356,519 B1 * 3/2002 Wakuda ................. G11B 5/596
369/44.28

FOREIGN PATENT DOCUMENTS

JP 2004-108774 A 4/2004

* cited by examiner

*Primary Examiner* — Que T Le
(74) *Attorney, Agent, or Firm* — Maschoff Brennan

(57) ABSTRACT

A position detecting device detects the position of a moving body by using first and second detected signals that have voltage values changing in connection with a movement of the moving body. The position detecting device includes a difference computing unit that computes first and second difference values, the first being the difference between a center voltage of the first detected signal and the voltage value of the first detected signal, and the second being the difference between a center voltage of the second detected signal and the voltage value of the second detected signal. A ratio computing unit computes a difference-sum ratio index in accordance with the ratio of the difference value between the absolute values of the first and second difference values and the absolute value of the second difference value to the sum of the absolute values of the first and second difference values.

7 Claims, 8 Drawing Sheets

POSITION DETECTING DEVICE, ELECTRONIC APPARATUS, RECORDING APPARATUS, ROBOT, AND POSITION DETECTING METHOD HAVING A RATIO COMPUTING UNIT

BACKGROUND

1. Technical Field

The present invention relates to a technology that detects the position of a moving body.

2. Related Art

In the related art, there is suggested a technology that detects the position of a moving body such as the rotor of a motor. For example, in JP-A-2004-108774, there is disclosed a configuration of an optical rotary encoder in which a light-receiving element receives light that is transmitted through a plurality of disc slits which operates in connection with the rotation of a motor and in which the angle of rotation of the motor is detected according to an electrical signal that is output from the light-receiving element. The angle of rotation of the motor is computed by an operation that uses the amplitude value of an A-phase sine wave signal and the amplitude value of a B-phase sine wave signal which the light-receiving element outputs.

The technology of JP-A-2004-108774, however, has the problem of a decrease in the accuracy of position detection in that the amplitude value (particularly, the peak-to-peak value) of the electrical signal that the light-receiving element outputs changes due to variations in the speed of rotation of the motor or in the shape of the slits.

SUMMARY

An advantage of some aspects of the invention is to detect the position of a moving body with high accuracy.

A position detecting device according to an aspect of the invention, that detects the position of a moving body by using a first detected signal and a second detected signal that have voltage values changing in connection with a movement of the moving body and have a phase difference, includes a difference computing unit that computes a first value and a second value, the first value being the difference value between a center voltage of the first detected signal and the voltage value of the first detected signal, and the second value being the difference value between a center voltage of the second detected signal and the voltage value of the second detected signal; a ratio computing unit that computes the ratio of the difference value between the absolute value of the first value and the absolute value of the second value to the sum of the absolute value of the first value and the absolute value of the second value; and a position specifying unit that specifies the position of the moving body by using the ratio. In the above configuration, the ratio is computed by using the center voltage of the first detected signal and the center voltage of the second detected signal, and the position of the moving body is specified according to the ratio. The center voltage tends to be unlikely to be erroneous or be changed in comparison with the voltage amplitude (particularly, the peak-to-peak value) of the detected signal. Therefore, in this case, the position of the moving body can be accurately detected in comparison with a configuration in which the position of the moving body is specified by using the voltage amplitude of an electrical signal. The position that is specified in the above configuration is assumed to include, for example, the position of rotation (angle of rotation) of the moving body when the moving body is a rotating body.

In a preferred embodiment of the invention, the position detecting device further includes a determining unit that determines the sign of each of the first value and the second value, and the position specifying unit specifies the position of the moving body by using a combination of the signs of the first value and the second value and the ratio. In this embodiment, since the position that is in accordance with the ratio is specified within a range that corresponds to the result of the determination performed by the determining unit among a plurality of ranges that have different combinations of the signs of the first value and the second value, the position of the moving body can be specified with high accuracy in comparison with a configuration in which the range of the position of the moving body is not limited. In addition, since the range of the position of the moving body is specified according to the signs of the first value and the second value that are applied to the computation of the ratio, process load is reduced in comparison with a configuration in which the range of the position of the moving body is specified by a process that is irrelevant to the computation of the ratio.

In a preferred embodiment of the invention, the position detecting device further includes a storage unit that includes correspondence information between the position of the moving body and the ratio and that the position specifying unit specifies the position of the moving body by using the ratio and the correspondence information. In this embodiment, the position of the moving body can be specified in a simple manner by using the ratio and the correspondence information.

An electronic apparatus according to another aspect of the invention includes a motor that includes a rotating moving body, and the position detecting device according to any of the configurations described above that detects the position of rotation of the moving body. The position detecting device according to the configuration described above and the motor that includes the moving body are used in various types of electronic apparatus. Specifically, preferred examples of the electronic apparatus may include a laser scanner apparatus, a servo motor, a robot, an NC working machine, and a 3D printer. However, the range of application of the invention is not limited to the examples.

A recording apparatus according to still another aspect of the invention includes a motor that includes a moving body which rotates by the supply of a drive signal, and the position detecting device described above that detects the position of rotation of the moving body. The position detecting device according to the configuration described above and the motor that includes the moving body are used in various types of recording apparatus. Specifically, preferred examples of the recording apparatus may include a label printing apparatus (image recording apparatus) and a printer. However, the range of application of the invention is not limited to the examples.

A robot according to yet another aspect of the invention includes a motor that includes a moving body which rotates by the supply of a drive signal, and the position detecting device described above that detects the position of rotation of the moving body. The position detecting device according to the configuration described above and the motor that includes the moving body are used in various types of robot. Specifically, preferred examples of the robot may include a vertical articulated robot, a dual arm robot, and a multiaxial robot as well. However, the range of application of the invention is not limited to the examples.

The position detecting device described above that detects the position of a moving body can be perceived as a position detecting method for a moving body. Specifically, a position detecting method according to a preferred embodiment of the invention is a position detecting method that detects the position of a moving body by using a first detected signal and a second detected signal that have voltage values changing in connection with a movement of the moving body and have a phase difference, and includes computing a first value and a second value, the first value being the difference value between a center voltage of the first detected signal and the voltage value of the first detected signal, and the second value being the difference value between a center voltage of the second detected signal and the voltage value of the second detected signal; computing the ratio of the difference value between the absolute value of the first value and the absolute value of the second value to the sum of the absolute value of the first value and the absolute value of the second value; and specifying the position of the moving body by using the ratio. According to the position detecting method exemplified above, the same effect as the position detecting device according to the aspect of the invention is realized.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
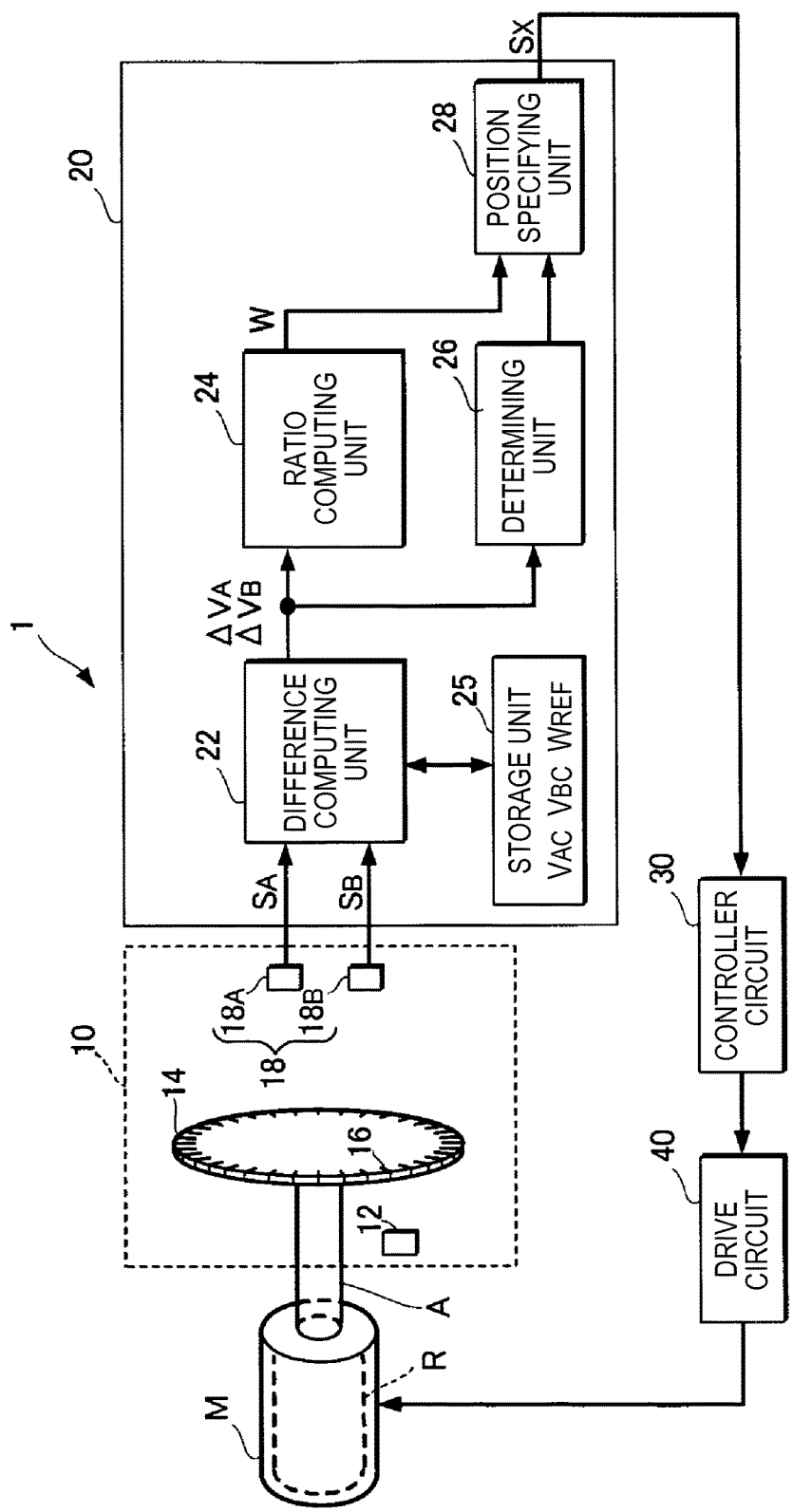
FIG. 1 is a configuration diagram of a drive control system according to an embodiment of the invention.

A drive control system 1 according to an embodiment of the invention will be described with reference to the drawings. FIG. 1 is a configuration diagram of the drive control system 1 for a motor M according to an exemplary embodiment of the invention. The drive control system 1 is configured to include the motor M, a rotary encoder 10, a position detecting device 20, a controller circuit 30, and a drive circuit 40. The drive control system 1 of the present embodiment detects the position (angle of rotation) of the motor M with the position detecting device 20 and, according to the detected position and a target position, adjusts a drive voltage that is supplied to the motor M.

The motor M is, for example, a stepper motor that operates according to a predetermined drive voltage (pulse). The motor M is configured to include a rotor R that is an example of a moving body. The rotor R rotates by a predetermined angle as one step each time a pulse is supplied to a coil. The angle of rotation (step angle) of the rotor R is determined according to the number of pulses. That is, by adjusting the number of pulses supplied to the rotor R, the rotor R can be positioned at a desired angle of rotation. The position detecting device 20 detects a position (angle of rotation) X of the rotor R.

The rotary encoder 10 outputs a detected signal that is in accordance with the position of the rotor R. As illustrated in FIG. 1, the rotary encoder 10 is configured to include a light-emitting unit 12, a disc 14, and a light-receiving unit 18 (18A and 18B). The disc 14 of which the center is fixed to a rotation axis A of the rotor R rotates in connection with the rotation of the rotor R. A slit 16 is formed at each predetermined angle on the periphery of the disc 14. The slit 16 transmits light. The light-emitting unit 12 and each light-receiving unit 18 are arranged at positions that face each other through the disc 14. The light-emitting unit 12 is a light-emitting element such as a light-emitting diode (LED) and irradiates the disc 14 with light. The light-receiving unit 18 is a light-receiving element such as a photodiode and outputs voltage signals (a first detected signal $S_A$ and a second detected signal $S_B$) according to the amount of light received. The rotary encoder 10 of the present embodiment includes the light-receiving unit 18A and the light-receiving unit 18B. The light-receiving unit 18A outputs the first detected signal $S_A$, and the light-receiving unit 18B outputs the second detected signal $S_B$.

Figure 2:
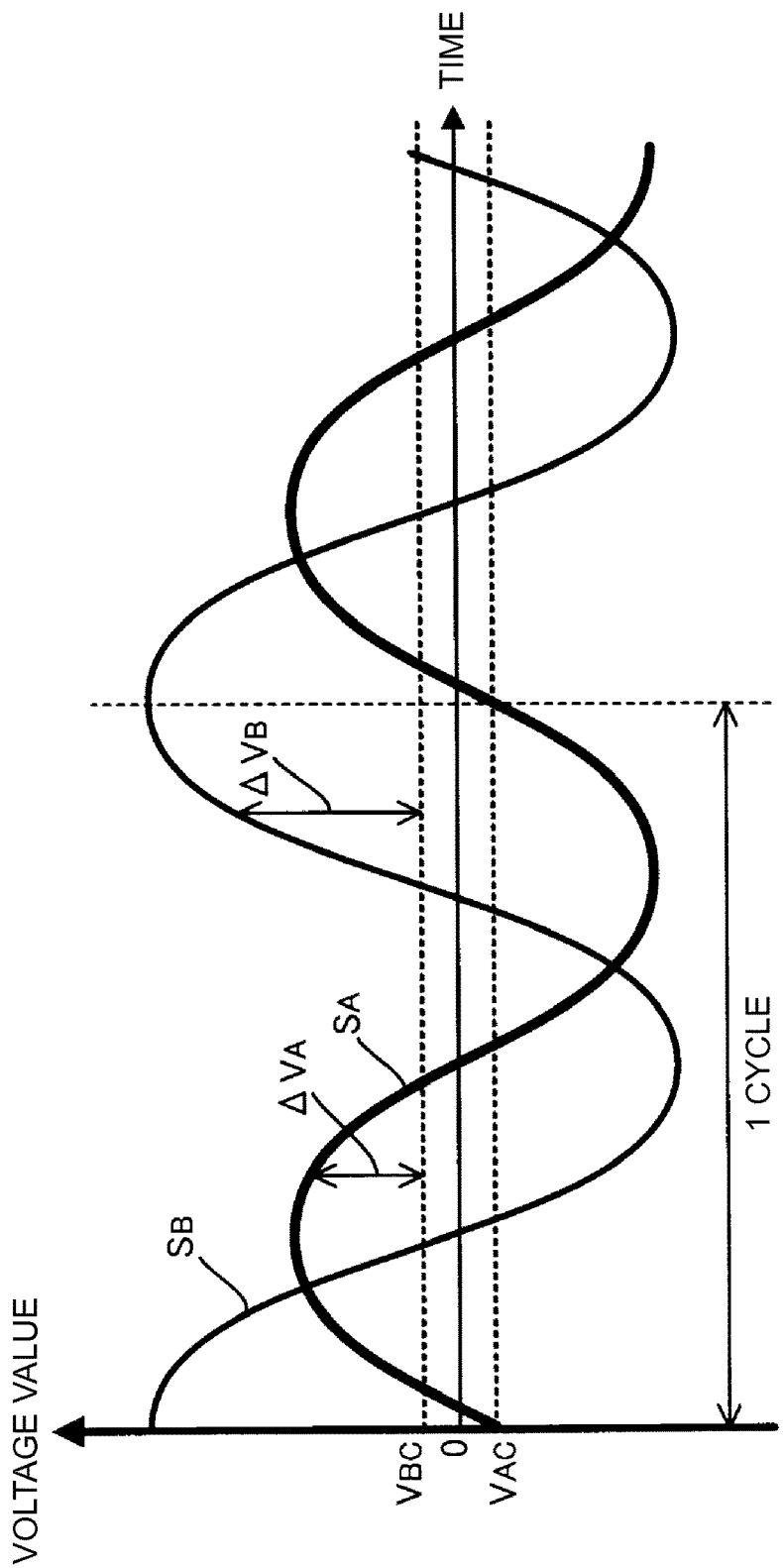
FIG. 2 is a descriptive diagram of a first detected signal and a second detected signal.

FIG. 2 is a descriptive diagram of the first detected signal $S_A$ and the second detected signal $S_B$ of the present embodiment. The voltage values of the first detected signal $S_A$ and the second detected signal $S_B$ change in connection with the position X of the rotor R. Specifically, the amount of light received by the light-receiving unit 18 changes periodically because the state where light emitted from the light-emitting unit 12 is transmitted through the slit 16 and the state where the light is blocked by the disc 14 are alternately switched along with the rotation of the rotor R. Thus, the first detected signal $S_A$ and the second detected signal $S_B$ of which the voltage values change periodically in connection with the rotation of the rotor R are output from the light-receiving unit 18. The first detected signal $S_A$ and the second detected signal $S_B$ are correctly not sine waves but are illustrated as sine waves in FIG. 2 for convenience of representation of the drawings. As illustrated in FIG. 2, the first detected signal $S_A$ and the second detected signal $S_B$ have a phase difference. Specifically, the light-receiving unit 18A and the light-receiving unit 18B are installed at different positions along the circumference of the disc 14 such that the phase difference value between the first detected signal $S_A$ and the second detected signal $S_B$ is π/2 (90°).

The position detecting device 20 of FIG. 1 specifies the position X of the rotor R by using the first detected signal $S_A$ and the second detected signal $S_B$ and outputs a detected position signal $S_X$ that indicates the position X. The position detecting device 20, as illustrated in FIG. 1, is configured to include a difference computing unit 22, a ratio computing unit 24, a storage unit 25, a determining unit 26, and a position specifying unit 28.

The storage unit 25 is a unit that stores information used in specifying the position X and is configured of a known recording medium such as a semiconductor recording medium. The storage unit 25 of the present embodiment stores a center voltage $V_{AC}$ of the first detected signal $S_A$, a center voltage $V_{BC}$ of the second detected signal $S_B$, and a reference value (an example of correspondence information) $W_{REF}$ that corresponds to the different position X of the rotor R. The center voltage $V_{AC}$ of the first detected signal $S_A$ and the center voltage $V_{BC}$ of the second detected signal $S_B$, for example, are measured for each drive control system 1 and are stored on the storage unit 25 before shipment.

The difference computing unit 22, as illustrated in Equation (1A) and FIG. 2, computes a difference $\Delta V_A$ (hereinafter, referred to as "first difference") of a voltage value $V_A$ of the first detected signal $S_A$ and the center voltage $V_{AC}$ of the first detected signal $S_A$. In addition, the difference computing unit 22, as illustrated in Equation (1B) and FIG. 2, computes a difference $\Delta V_B$ (hereinafter, referred to as "second difference") of a voltage value $V_B$ of the second detected signal $S_B$ and the center voltage $V_{BC}$ of the second detected signal $S_B$. The difference computing unit 22 outputs the first difference $\Delta V_A$ (an example of a first value) and the second difference $\Delta V_B$ (an example of a second value), which are computed by the operations of Equation (1A) and Equation (1B), to each of the ratio computing unit 24 and the determining unit 26.

$$\Delta V_A = V_A - V_{AC} \tag{1A}$$

$$\Delta V_B = V_B - V_{BC} \tag{1B}$$

The ratio computing unit 24 computes an index (hereinafter, referred to as "difference-sum ratio index") W by an operation to which the first difference $\Delta V_A$ and the second difference $\Delta V_B$ computed by the difference computing unit 22 are applied. The difference-sum ratio index W is used to specify the position X of the rotor R. Specifically, the ratio computing unit 24 computes the difference-sum ratio index W (an example of a ratio) that is in accordance with the ratio of the difference value between the absolute value $|\Delta V_A|$ of the first difference $\Delta V_A$ and the absolute value $|\Delta V_B|$ of the second difference $\Delta V_B$ to the sum of the absolute value $|\Delta V_A|$ of the first difference $\Delta V_A$ and the absolute value $|\Delta V_B|$ of the second difference $\Delta V_B$. In the present embodiment, as illustrated in Equation (2) below, the ratio of the difference value between the absolute value $|\Delta V_A|$ and the absolute value $|\Delta V_B|$ to the sum of both thereof is computed as the difference-sum ratio index W. The ratio computing unit 24 outputs the difference-sum ratio index W which is computed by Equation (2) to the position specifying unit 28.

$$W = \frac{|\Delta V_A| - |\Delta V_B|}{|\Delta V_A| + |\Delta V_B|} = \frac{|V_A - V_{AC}| - |V_B - V_{BC}|}{|V_A - V_{AC}| + |V_B - V_{BC}|} \tag{2}$$

Figure 3:
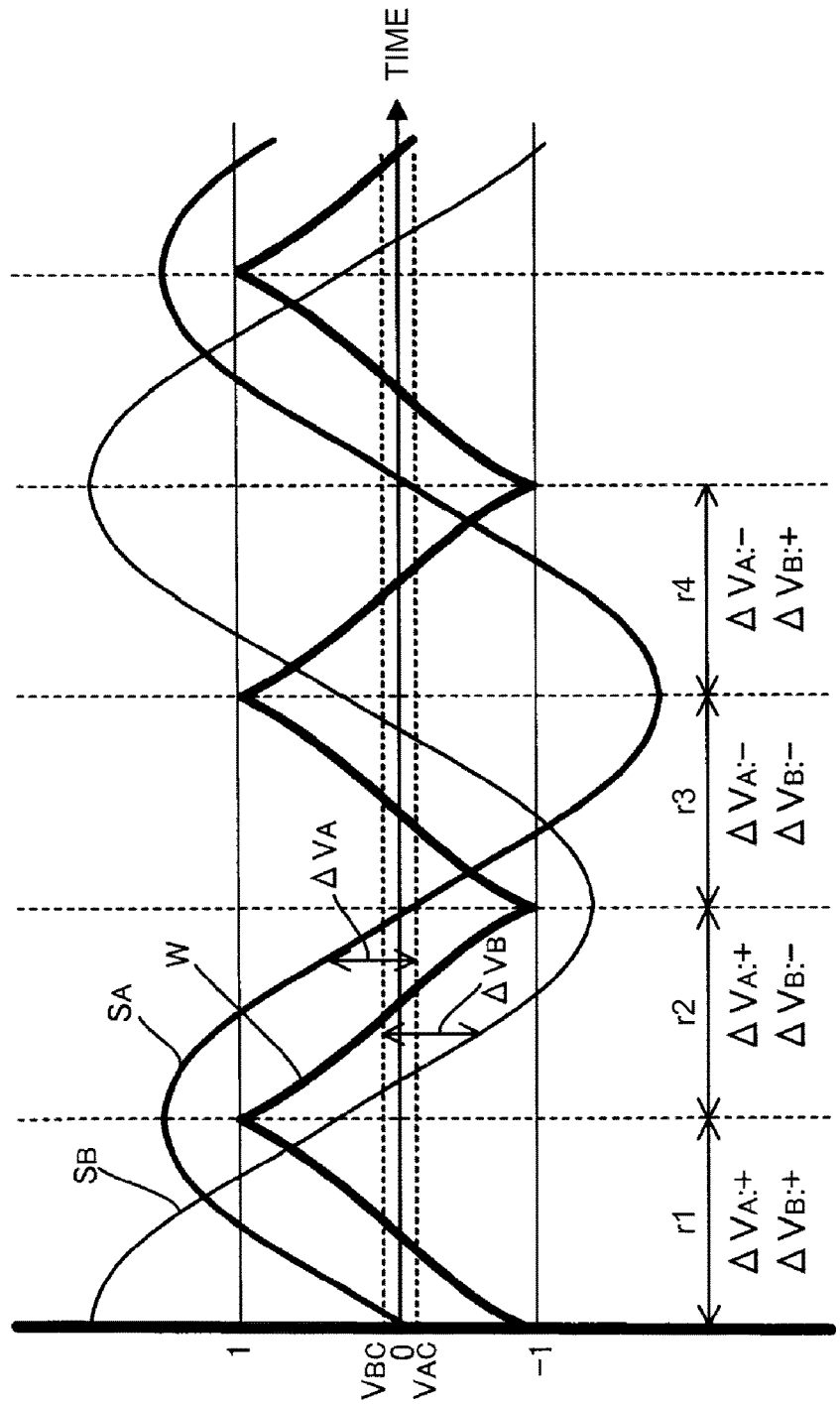
FIG. 3 is a descriptive diagram of a difference-sum ratio index.

The difference-sum ratio index W computed in the above method changes periodically within an inclusive range of −1 and 1 in connection with the first difference $\Delta V_A$ and the second difference $\Delta V_B$ (specifically, the difference value between both thereof) as illustrated in FIG. 3.

The determining unit 26 of FIG. 1 determines the sign of each of the first difference $\Delta V_A$ and the second difference $\Delta V_B$. In the present embodiment, the range of the position X of the rotor R (a range corresponding to one cycle of the first detected signal $S_A$ or the second detected signal $S_B$, illustrated in FIG. 2) may be divided into four ranges r (r1 to r4) that have different combinations of the signs of the first difference $\Delta V_A$ and the second difference $\Delta V_B$ as illustrated in FIG. 3. Specifically, (1) the first difference $\Delta V_A$ and the second difference $\Delta V_B$ are both positive when the position X of the rotor R is within the range r1, and (2) the first difference $\Delta V_A$ is positive, and the second difference $\Delta V_B$ is negative when the position X of the rotor R is within the range r2. In addition, (3) the first difference $\Delta V_A$ and the second difference $\Delta V_B$ are both negative when the position X of the rotor R is within the range r3, and (4) the first difference $\Delta V_A$ is negative, and the second difference $\Delta V_B$ is positive when the position X of the rotor R is within the range r4. Therefore, by identifying the combination of the signs of the first difference $\Delta V_A$ and the second difference $\Delta V_B$, one range r to which the position X of the rotor R belongs can be specified from the plurality of ranges r1 to r4.

The position specifying unit 28 specifies the position X of the rotor R according to the difference-sum ratio index W computed by the ratio computing unit 24 and the result of the determination performed by the determining unit 26 (the sign of each of the first difference $\Delta V_A$ and the second difference $\Delta V_B$). Specifically, the position specifying unit 28 first specifies, among the plurality of ranges r1 to r4, one range (hereinafter, referred to as "target range") r that corresponds to the combination of the signs of the first difference $\Delta V_A$ and the second difference $\Delta V_B$ computed by the difference computing unit 22. Specifically, as understood from FIG. 3, when the first difference $\Delta V_A$ and the second difference $\Delta V_B$ are both positive, the range r1 is specified as the target range r. When the first difference $\Delta V_A$ is positive, and the second difference $\Delta V_B$ is negative, the range r2 is specified as the target range r. When the first difference $\Delta V_A$ and the second difference $\Delta V_B$ are both negative, the range r3 is specified as the target range r. When the first difference $\Delta V_A$ is negative, and the second difference $\Delta V_B$ is positive, the range r4 is specified as the target range r.

Second, the position specifying unit 28 of the present embodiment specifies the position X of the rotor R according to the difference-sum ratio index W within the target range r. Specifically, the position specifying unit 28 specifies the position X of the rotor R by comparing the difference-sum ratio index W with the reference value $W_{REF}$ stored on the storage unit 25.

Figure 4:
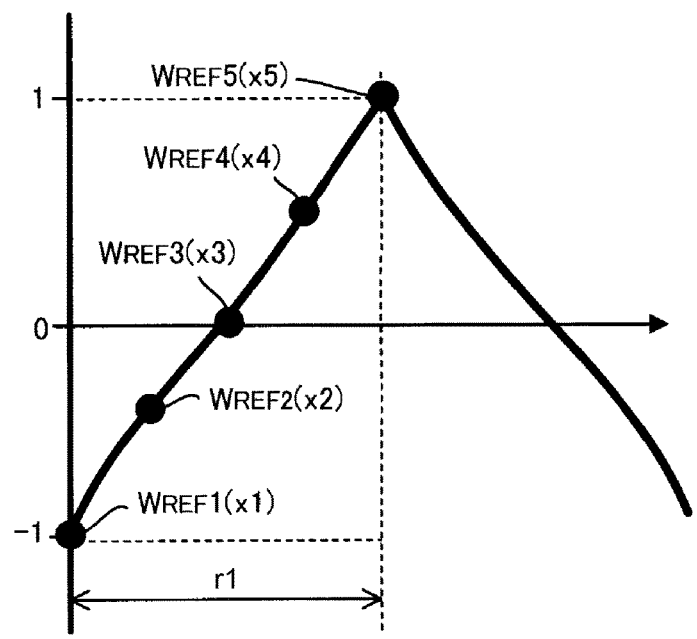
FIG. 4 is a descriptive diagram of a reference value.

FIG. 4 is a descriptive diagram of the reference value $W_{REF}$. A plurality of reference values $W_{REF}$ ($W_{REF}1$, $W_{REF}2$, $W_{REF}3$, $W_{REF}4$, $W_{REF}5$, that corresponds to different positions x (x1, x2, x3, x4, x5, ... ) in the range r is stored on the storage unit 25.

The number of reference values $W_{REF}$ stored on the storage unit 25, for example, is set according to a multiplication number N (N=2K, 2K: resolution) of the rotary encoder 10. For convenience of description, FIG. 4 illustrates a configuration in which reference values ($W_{REF}1$, $W_{REF}2$, $W_{REF}3$, $W_{REF}4$, and $W_{REF}5$) are set for each section into which the range r1 is divided by the multiplication number N. However, the multiplication number N (resolution of the rotary encoder 10) is variably controlled. As understood from the description herebefore, the accuracy of detecting the position X of the rotor R can be improved by increasing the multiplication number N. The reference value $W_{REF}$ stored on the storage unit 25, for example, may be set to a numerical value that is computed by the operation of above Equation (2) to which a standard value (theoretical value) of the first detected signal $S_A$ and a standard value of the second detected signal $S_B$ are applied.

Figure 5:
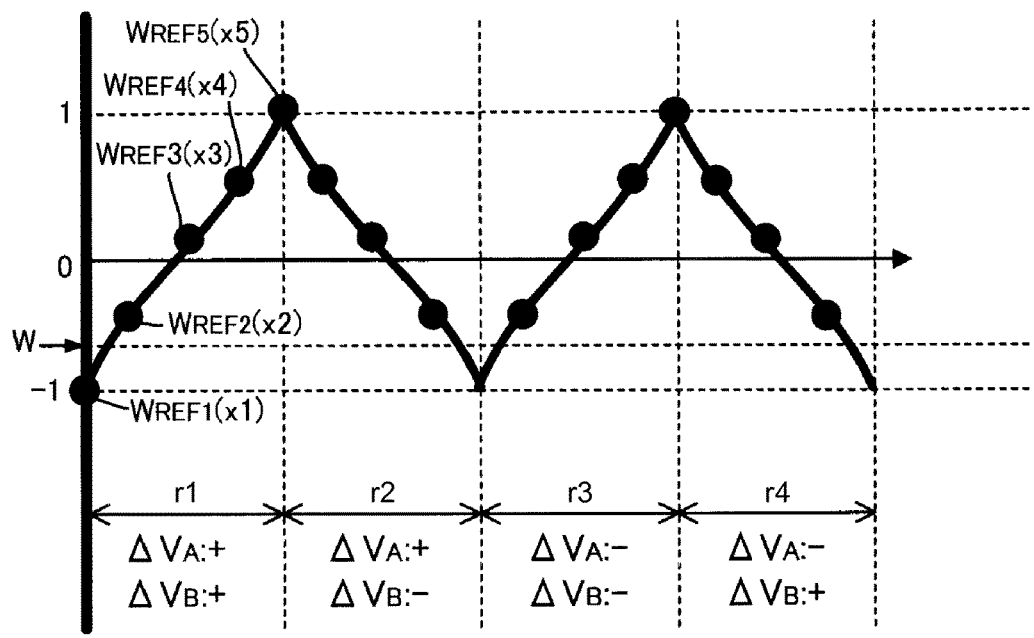
FIG. 5 is a descriptive diagram of specifying the reference value in a position specifying unit.

FIG. 5 is a descriptive diagram of specifying the reference value $W_{REF}$ in the position specifying unit 28. The position specifying unit 28 specifies one reference value $W_{REF}$ (hereinafter, referred to as "target reference value") by comparing the difference-sum ratio index W computed by the ratio computing unit 24 with each reference value $W_{REF}$ in the target range r. Specifically, among the plurality of reference values $W_{REF}$, one reference value $W_{REF}$ that is closest to the difference-sum ratio index W is specified as the target reference value $W_{REF}$. For example, as illustrated in FIG. 5, when the difference-sum ratio index W is positioned between the successive reference value $W_{REF}1$ and the reference value $W_{REF}2$ in the target range r (=r1), the one having a smaller difference with the difference-sum ratio index W is specified as the target reference value $W_{REF}$. Specifically, a difference [$W_{REF}1-W$] between the reference value $W_{REF}1$ and the difference-sum ratio index W and a difference [$W_{REF}2-W$] between the reference value $W_{REF}2$ and the difference-sum ratio index W are compared, and the reference value $W_{REF}1$ having a smaller difference is specified as the target reference value $W_{REF}$. The position specifying unit 28 specifies, among the plurality of positions x that corresponds to the different reference values $W_{REF}$ in the target range r, one position x that corresponds to the target reference value $W_{REF}$ as the position X of the rotor R. Specifically, the detected position signal $S_X$ that indicates the current position X of the rotor R is output to the controller circuit 30. As understood from the description hereinbefore, the reference values $W_{REF}$ that correspond to the different positions X of the rotor R correspond to "correspondence information" that represents correspondences between the position of the rotor R (moving body) and the difference-sum ratio index W (ratio).

The controller circuit 30 of FIG. 1 computes the number of drive pulses necessary for rotating the rotor R to a target position from the detected position signal $S_X$ that is output from the position specifying unit 28 and notifies the number of drive pulses to the drive circuit 40. The drive circuit 40 is, for example, an oscillator circuit and generates and supplies the number of drive pulses notified by the controller circuit 30 to the motor M.

The voltage amplitudes (particularly, the peak-to-peak values) of the first detected signal $S_A$ and the second detected signal $S_B$ are likely to be erroneous or be changed due to various causes such as an error in manufacturing the slits of the disc or an error in the speed of rotation of the rotor R. On the other hand, the center voltage $V_{AC}$ of the first detected signal $S_A$ and the center voltage $V_{BC}$ of the second detected signal $S_B$ tend to be unlikely to be erroneous or be changed in comparison with the voltage amplitude. In the present embodiment, the position X of the rotor R is specified by using the difference-sum ratio index W that is computed according to the center voltage $V_{AC}$ of the first detected signal $S_A$ and the center voltage $V_{BC}$ of the second detected signal $S_B$. Therefore, the position X of the rotor R can be accurately detected in comparison with a configuration of the related art that detects the position of the rotor R by using the voltage amplitude (for example, the peak-to-peak value) of the detected signal.

In the present embodiment, the target range r is specified from the plurality of ranges r1 to r4 in one cycle of the first detected signal $S_A$ or the second detected signal $S_B$ according to the combination of the signs of the first difference $\Delta V_A$ and the second difference $\Delta V_B$, and the position X of the rotor R is specified within the target range r. Therefore, the position X of the rotor R can be finely specified in comparison with a configuration in which the range of the position X of the rotor R is not limited. Furthermore, the present embodiment has the advantage of being able to specify the position X of the rotor R in a simple manner by comparing the difference-sum ratio index W with the reference value $W_{REF}$ that is set for each position x.

Electronic Apparatus

Hereinafter, an example of an electronic apparatus to which the motor M and the position detecting device 20 according to the above embodiment are applied will be described.

Laser Scanner Apparatus

Figure 6:
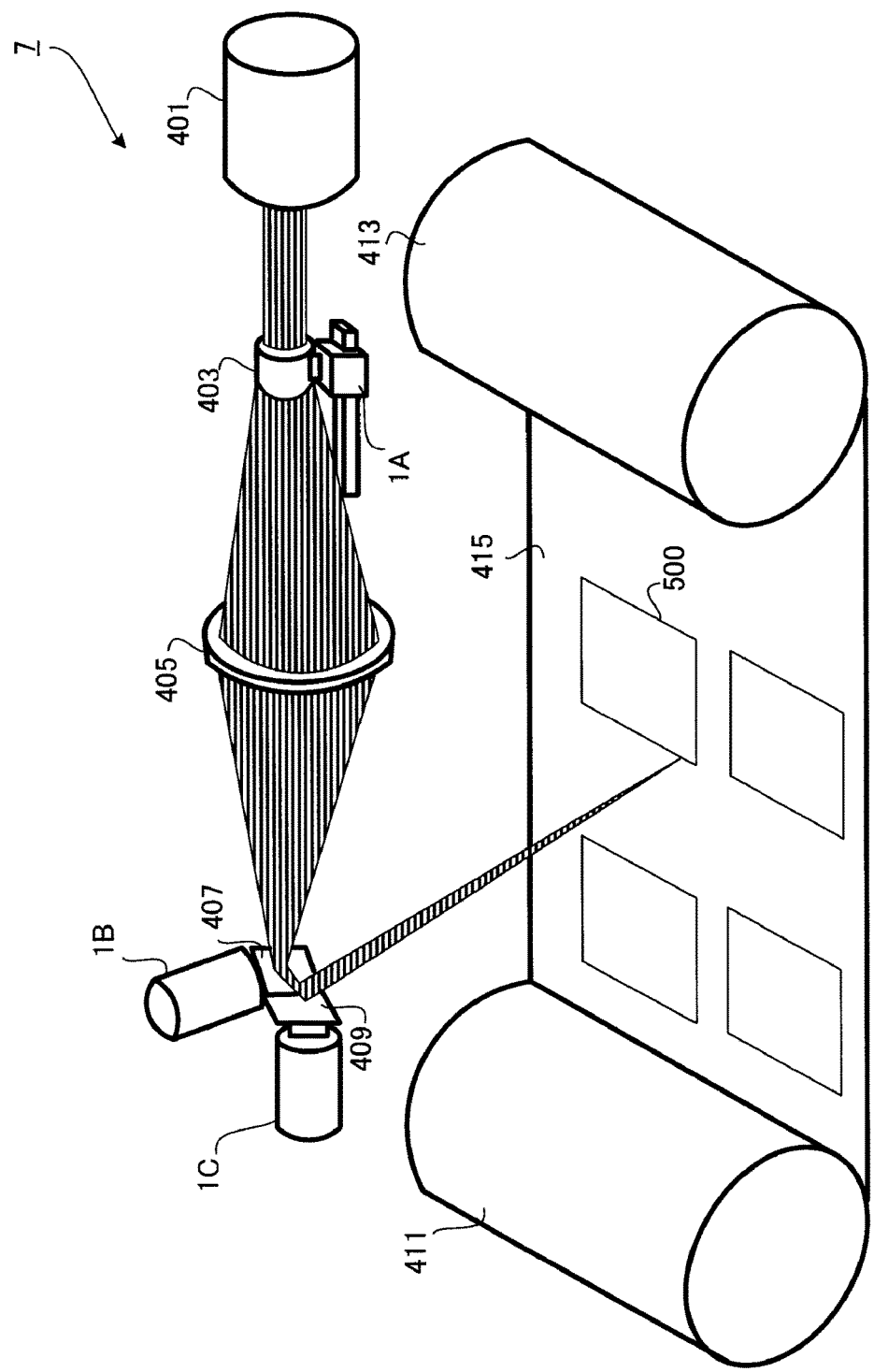
FIG. 6 is a schematic configuration diagram of a laser scanner apparatus to which the drive control system according to the embodiment of the invention is applied.

FIG. 6 is a diagram illustrating a configuration example of a laser scanner apparatus 7 to which the drive control system 1 according to the above embodiment is applied. The laser scanner apparatus 7 can be used in clipping printed matters such as labels. The laser scanner apparatus 7 is provided with a laser oscillator 401, an irradiation optical system (a first lens 403, a second lens 405, a first mirror 407, and a second mirror 409), and a plurality of drive control systems 1 (1A, 1B, and 1C) that is exemplified in the above embodiment. Laser light that is emitted from the laser oscillator 401 converges at one point on the surface of a working matter 415 via refraction by the first lens 403, concentration by the second lens 405, and reflection by the first mirror 407 and the second mirror 409. The working matter 415 is a sheet-shaped member and is wound by a transport body 413 while being delivered by the rotation of a transport body 411.

The drive control system 1A corresponds to the first lens 403, the drive control system 1B corresponds to the first mirror 407, and the drive control system 1C corresponds to the second mirror 409. The axis of rotation of the motor M (refer to FIG. 1) of the drive control system 1A is connected to the first lens 403. The position of the first lens 403 is adjusted in connection with the rotation of the rotor R. The axis of rotation of the motor M of the drive control system 1B is connected to the first mirror 407. The angle of the first mirror 407 is adjusted in connection with the rotation of the rotor R. Similarly, the axis of rotation of the motor M of the drive control system 1C is connected to the second mirror 409. The angle of the second mirror 409 is adjusted in connection with the rotation of the rotor R.

A desired position on the working matter 415 can be irradiated with the laser light by controlling each motor M with the drive control system 1 (1A, 1B, and 1C). Accordingly, as illustrated in FIG. 6, the laser scanner apparatus 7 can accurately irradiate a working line 500 with laser light on the surface of the working matter 415. The working line 500 indicates a position where a laser work is supposed to be performed.

While the laser scanner apparatus 7 is exemplified herebefore as the electronic apparatus that is provided with the motor M and the position detecting device 20 of the above embodiment, the electronic apparatus to which the motor M and the position detecting device 20 of the embodiment are applied is not limited to the laser scanner apparatus 7 exemplified herebefore. For example, a servo motor, an NC working machine, and a 3D printer may be exemplified as exemplary examples of the electronic apparatus according to the invention.

Robot

Next, a robot 8 to which the motor M and the position detecting device 20 according to the above embodiment are applied will be described. While a vertical articulated robot (six axes) is illustrated as an example of the robot below, the robot is not limited to this and may be a dual arm robot or a multiaxial robot as well.

Figure 7:
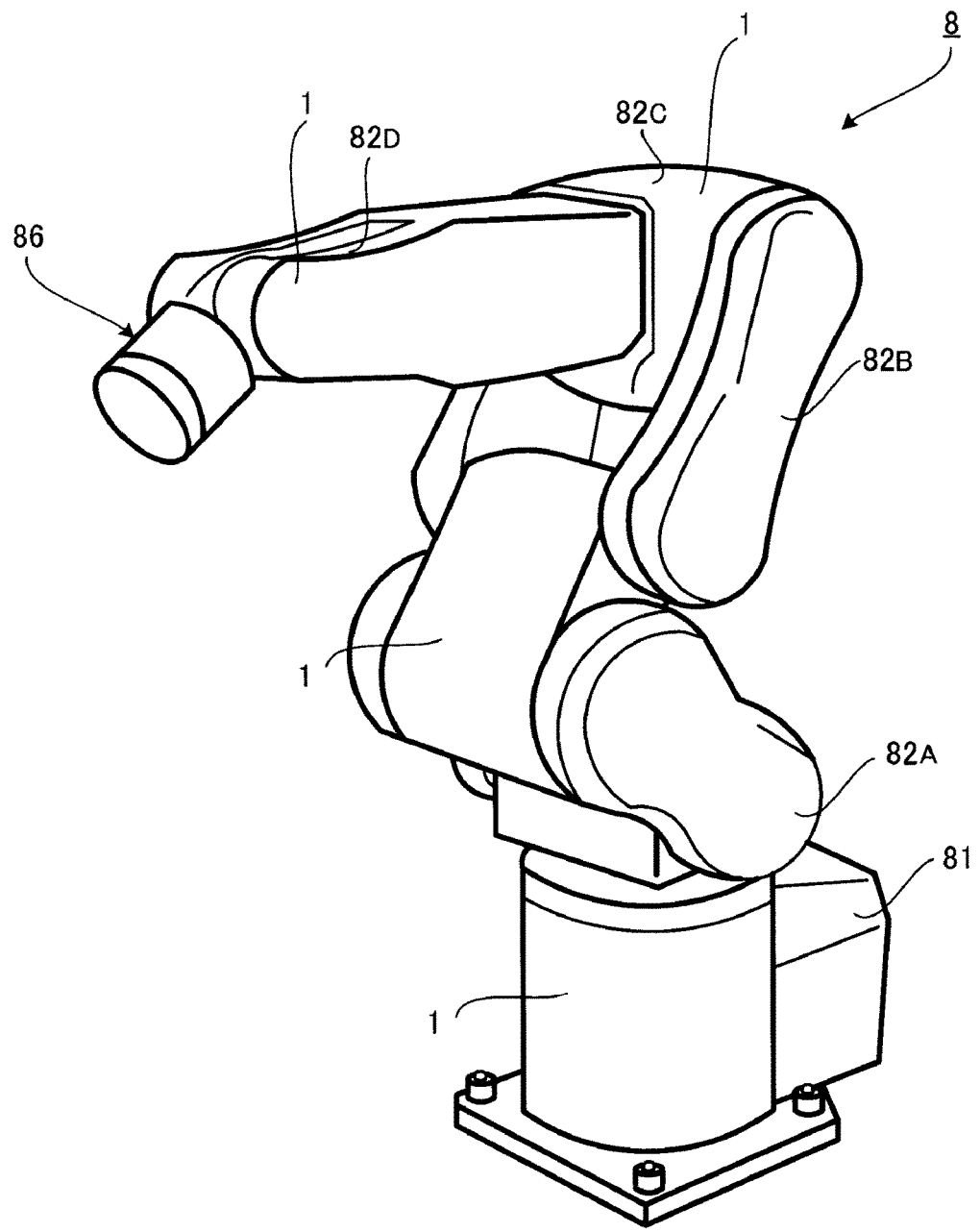
FIG. 7 is a schematic configuration diagram of a robot to which the drive control system according to the embodiment of the invention is applied.

FIG. 7 is a diagram illustrating a configuration example of the robot 8 to which the drive control system 1 according to the above embodiment is applied. As illustrated in FIG. 7, the robot 8 is a vertical articulated robot that is provided with a base 81, a plurality of arms 82 (82A, 82B, 82C, and 82D), and a wrist 86. Each of the plurality of arms 82 is connected in order through a pivot axis (joint), and the drive control system 1 according to the above embodiment is installed in each pivot axis. The motor M (not illustrated in FIG. 7) of the drive control system 1 causes the arm 82 on one side of the pivot axis to pivot with respect to the arm on the other side. The arm 82A on the base end side among the plurality of arms 82 (82A, 82B, 82C, and 82D) is supported by the base 81 in a pivotable manner with respect to the base 81, and the wrist 86 is supported by the arm 82D on the tip end side in a pivotable manner. The motor M of the drive control system 1 that is installed inside the base 81 causes the arm 82A to pivot with respect to the base 81, and the motor M of the drive control system 1 that is installed in the arm 82D causes the wrist 86 to pivot. The tip end face of the wrist 86 is a mounting face on which a manipulator that holds a precision device such as a wristwatch is mounted.

According to the robot 8 described above, the position of rotation of the motor M that is used to control the positions of pivoting of the four arms 82A, 82B, 82C, and 82D and the wrist 86 can be finely controlled. Therefore, the robot 8 can move the wrist 86 to a desired position with higher positional accuracy and pivoting accuracy.

Recording Apparatus

Hereinafter, an example of a recording apparatus that is provided with the laser scanner apparatus 7 to which the above drive control system 1 (1A, 1B, and 1C) is applied will be described. In the description below, the same configuration as the above laser scanner apparatus 7 will be designated by the same reference sign, and the description thereof will be simplified or will not be provided. Each layer and each member are scaled differently from the actual size thereof in each drawing so as to illustrate each layer and each member to a recognizable extent.

First Configuration Example of Recording Apparatus

Figure 8:
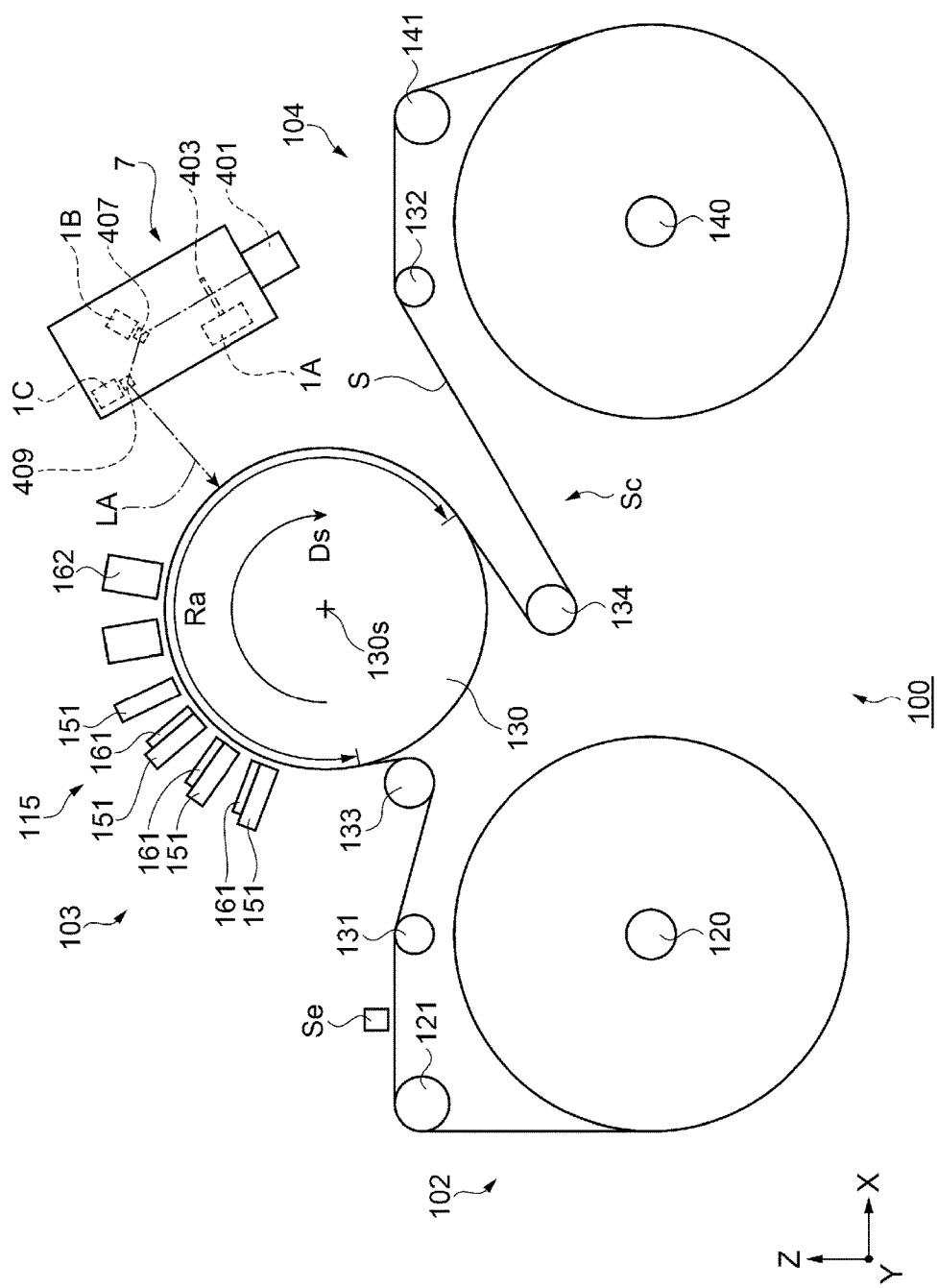
FIG. 8 is an exterior front view schematically illustrating a first configuration example of a recording apparatus (image recording apparatus) to which the drive control system according to the embodiment of the invention is applied.

First, an image recording apparatus 100 that is a label printing apparatus provided with a drum-shaped platen will be described as a first configuration example of the recording apparatus that is provided with the laser scanner apparatus 7 to which the above drive control system 1 (1A, 1B, and 1C) is applied. FIG. 8 is a front view schematically illustrating the image recording apparatus 100 that is provided with the laser scanner apparatus 7 to which the drive control system 1 (1A, 1B, and 1C) according to the above embodiment is applied.

In the image recording apparatus 100, as illustrated in FIG. 8, one piece of a sheet S (web) as a recording medium of which both ends are wound into rolls around an unwinding axis 120 and a winding axis 140 is stretched between the unwinding axis 120 and the winding axis 140, and the sheet S is transported from the unwinding axis 120 to the winding axis 140 along a transport path Sc on which the sheet S is stretched. The image recording apparatus 100 is configured to record (form) an image on the sheet S by discharging a functional liquid to the sheet S that is transported along the transport path Sc. The type of sheet S is not particularly limited. A paper type, a film type, and the like or a multilayer structure in which paper types and film types are attached in multiple layers through adhesives (for example, a base material of a seal piece) can be applied. Examples of a paper type include a high-quality paper, a cast-coated paper, an art paper, and a coated paper, and examples of a film type include a synthetic paper, polyethylene terephthalate (PET), and polypropylene (PP).

The image recording apparatus 100, as a schematic configuration, is configured to include an unwinding unit 102, a processing unit 103, the laser scanner apparatus 7, and an winding unit 104. The unwinding unit 102 unwinds the sheet S from the unwinding axis 120. The processing unit 103 records an image on the sheet S that is unwound from the unwinding unit 102. The laser scanner apparatus 7 clips the sheet S on which the image is recorded by the processing unit 103. The winding unit 104 winds the sheet S around the winding axis 140. In the description below, one of both faces of the sheet S where an image is recorded may be called a surface, and the face on the opposite side may be called a rear face.

The unwinding unit 102 includes the unwinding axis 120 and a driven roller 121. An end of the sheet S is wound onto the unwinding axis 120. The driven roller 121 winds the sheet S that is drawn from the unwinding axis 120. The unwinding axis 120 supports the sheet S of which the end is wound thereonto while the surface of the sheet S faces outward. When the unwinding axis 120 rotates in the clockwise direction of FIG. 8, the sheet S that is wound onto the unwinding axis 120 is unwound to the processing unit 103 via the driven roller 121. The sheet S is wound onto the unwinding axis 120 through a core tube (not illustrated) that is attachable to and detachable from the unwinding axis 120. Therefore, when the sheet S of the unwinding axis 120 is used up, the sheet S of the unwinding axis 120 can be replaced by mounting a new core tube onto which the roll-shaped sheet S is wound on the unwinding axis 120.

The processing unit 103 records an image on the sheet S, while the sheet S that is unwound from the unwinding unit 102 is supported by a platen drum 130 as a supporting unit, by appropriately processing the sheet S with recording heads 151 and the like that are arranged along the outer circumferential face of the platen drum 130 in a head unit 115.

The platen drum 130 is a cylinder-shaped drum that is rotatably supported by an unillustrated supporting mechanism with a drum axis 130s as the center of the platen drum 130. The platen drum 130 winds the sheet S that is transported from the unwinding unit 102 to the winding unit 104 on the rear face side of the sheet S. The platen drum 130 supports the sheet S on the rear face side of the sheet S while being passively rotated in a transport direction Ds of the sheet S by receiving a frictional force between the sheet S and the platen drum 130. Driven rollers 133 and 134 are disposed in the processing unit 103. The driven rollers 133 and 134 fold the sheet S on both sides of a portion where the sheet S is wound onto the platen drum 130. The driven roller 133 among the rollers folds the sheet S by winding the surface of the sheet S between the driven roller 121 and the platen drum 130. Meanwhile, the driven roller 134 folds the sheet S by winding the surface of the sheet S between the platen drum 130 and a driven roller 141. As such, by folding the sheet S on each of the upstream and downstream sides of the transport direction Ds with respect to the platen drum 130, the secured length of a part Ra of the platen drum 130 where the sheet S is wound can be long. Another driven roller 131 and an edge sensor Se that detects the widthwise end of the sheet S may be arranged between the driven roller 121 and the driven roller 133. In addition, another driven roller 132 may be arranged between the driven roller 134 and the driven roller 141.

The processing unit 103 is provided with the head unit 115, and the recording head 151 is arranged in the head unit 115. In the present embodiment, a plurality of recording heads 151 that corresponds to different colors is disposed. For example, four of the recording heads 151 that correspond to yellow, cyan, magenta, and black are disposed. Each recording head 151 faces the surface of the sheet S that is wound onto the platen drum 130 at a slight clearance (platen gap) and discharges the corresponding color functional liquid from nozzles by using the ink jet method. Then, a color image is formed on the surface of the sheet S when each recording head 151 discharges functional liquids to the sheet S that is transported in the transport direction Ds.

In the present embodiment, an ultraviolet (UV) ink (light-curable ink) that is cured when being irradiated with an ultraviolet ray (light) is used as a functional liquid. Therefore, a first UV light source 161 (light irradiation unit) is disposed in the head unit 115 of the processing unit 103 so as to temporarily cure and fix the UV ink to the sheet S. The first UV light source 161 for temporary curing is arranged between each of the plurality of recording heads 151. That is, the first UV light source 161 cures (temporarily cures) the UV ink to an extent in which the shape of the UV ink is not collapsed by irradiating the UV ink with a weak ultraviolet ray. Meanwhile, a second UV light source 162 as a curing unit for main curing is disposed on the downstream side of the transport direction Ds with respect to the plurality of recording heads 151 (head unit 115). That is, the second UV light source 162 completely cures the UV ink (main curing) by irradiating the UV ink with an ultraviolet ray that is stronger than that of the first UV light source 161. By performing the temporary curing and the main curing, the color image formed by the plurality of recording heads 151 can be fixed to the surface of the sheet S.

The laser scanner apparatus 7 is disposed to partially clip or divide the sheet S on which an image is recorded. The laser scanner apparatus 7 has the same configuration as the above configuration (refer to FIG. 6) and will not be described in detail.

The sheet S that is a working matter is irradiated with laser light that is oscillated by the laser oscillator 401 of the laser scanner apparatus 7 and that passes through the first lens 403, the first mirror 407, and the second mirror 409, and the like. The position of the first lens 403 is controlled by the drive control system 1A, and the positions of rotation (angles) of the first mirror 407 and the second mirror 409 are controlled by the drive control systems 1B and 1C. As such, a desired position on the sheet S can be irradiated with laser light LA with which the sheet S is irradiated by controlling the position of irradiation with each of the drive control systems 1A, 1B, and 1C. A part of the sheet S irradiated with the laser light LA is fused, and the sheet S is partially clipped or divided.

The part that is clipped or divided by the laser light LA after being fused may be discharged by an unillustrated discharging unit to a depository unit and be deposited therein or may be transported to the winding axis 140 while being held on the base material by the adhesive of the sheet S.

While the present configuration is described in an example where the sheet S after an image is recorded thereon is clipped or divided by fusing that uses the laser scanner apparatus 7, the configuration is not limited to the example. A desired position on the sheet S may be clipped or divided before an image is recorded on the sheet S.

According to the above image recording apparatus 100, the position of the rotor R of the motor M can be controlled with high accuracy in the drive control systems 1A, 1B, and 1C that are used to control the position irradiated with the laser light LA. Therefore, the image recording apparatus 100 can clip or divide the sheet S with high positional accuracy.

Second Configuration Example of Recording Apparatus

Next, a printer (recording apparatus) 211 that is provided with a flat plate-shaped platen will be described as a second configuration example of the recording apparatus that is provided with the laser scanner apparatus 7 to which the above drive control systems 1A, 1B, and 1C are applied. FIG. 1s a front view schematically illustrating the second configuration example of the recording apparatus that is provided with the laser scanner apparatus 7 to which the drive control system 1 (1A, 1B, and 1C) for a stepper motor according to the above embodiment is applied.

Figure 9:
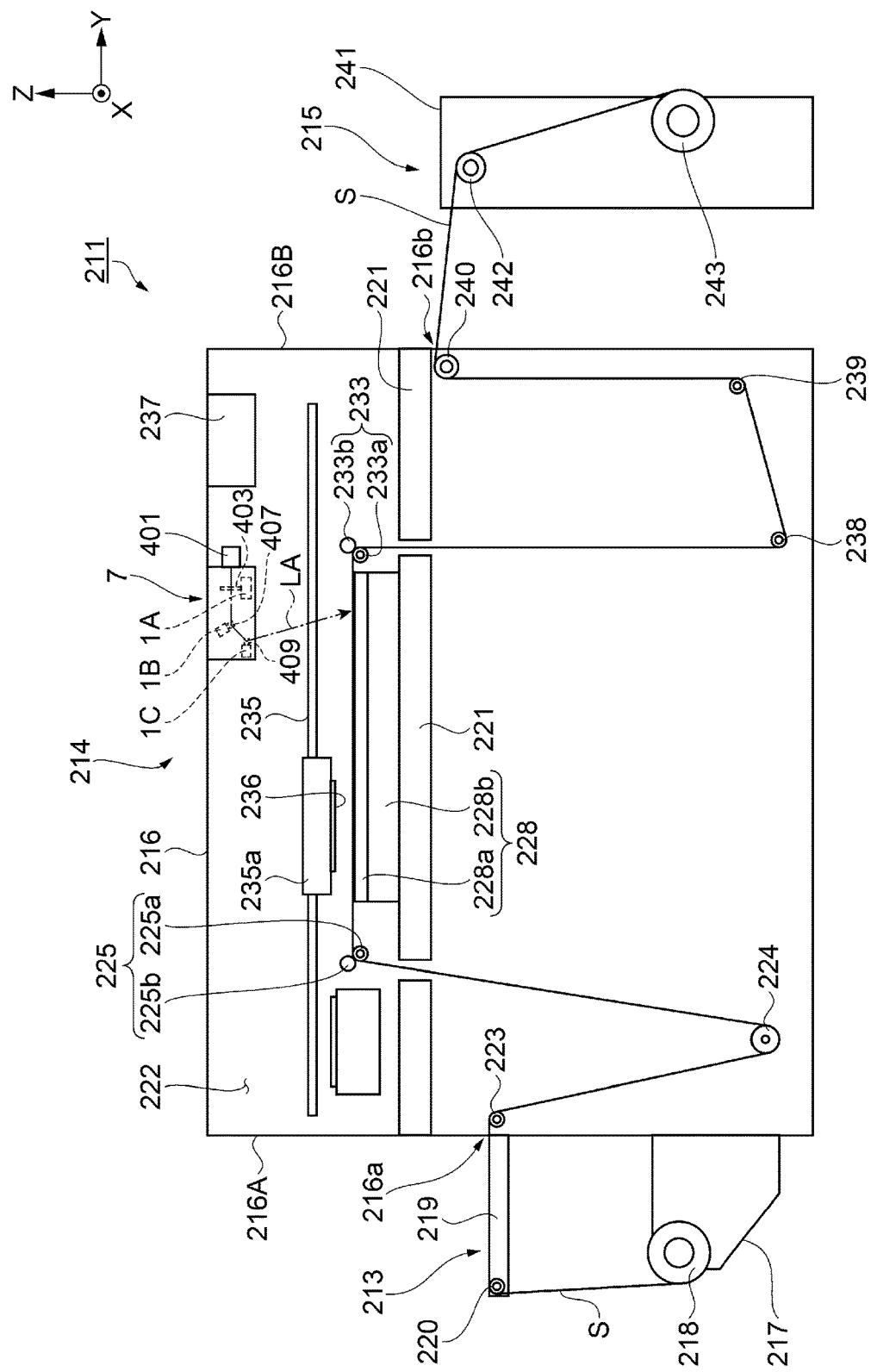
FIG. 9 is an exterior front view schematically illustrating a second configuration example (printer) of the recording apparatus to which the drive control system according to the embodiment of the invention is applied.

The printer (recording apparatus) 211, as illustrated in FIG. 9, uses the ink jet method of ejecting liquid onto the sheet S, which is a recording medium, from a plurality of recording heads (liquid ejecting heads) as a printing method. The printer 211 performs printing while sequentially unwinding one piece of the sheet S (web) that is wound into a roll and winds the sheet S into a roll again after the printing. The sheet S has the same configuration as the above first configuration example and will not be described here.

An XYZ orthogonal coordinate system in which an X direction is set to the widthwise direction of the sheet S in a horizontal plane, a Y direction to the transport direction of the sheet S that is orthogonal to the X direction, and a Z direction to the vertical direction is set in the present embodiment.

The printer 211 is provided with a main body unit 214, an unwinding unit 213, and a winding unit 215. The main body unit 214 performs printing. The unwinding unit 213 supplies the sheet S to the main body unit 214. The winding unit 215 winds the sheet S that is discharged from the main body unit 214.

The main body unit 214 is provided with a main body case 216. The unwinding unit 213 is installed on the upstream side (−Y side) of the transport direction of the main body case 216. The winding unit 215 is installed on the downstream side (+Y side) of the transport direction of the main body case 216. The unwinding unit 213 is connected to a medium supplying unit 216a that is disposed in a side wall 216A on the upstream side (−Y side) of the transport direction of the main body case 216. Meanwhile, the winding unit 215 is connected to a medium discharging unit 216b that is disposed in a side wall 216B on the downstream side (+Y side) of the transport direction of the main body case 216.

The unwinding unit 213 is provided with a supporting plate 217, a winding axis 218, an unwinding table 219, and a relay roller 220. The supporting plate 217 is installed on the lower portion of the side wall 216A of the main body case 216. The winding axis 218 is disposed in the supporting plate 217. The unwinding table 219 is connected to the medium supplying unit 216a of the main body case 216. The relay roller 220 is disposed at the tip end of the unwinding table 219. The sheet S that is wound into a roll is rotatably supported by the winding axis 218. The sheet S that is unwound from the roll (winding axis 218) is turned to the upper face of the unwinding table 219 after being wound onto the relay roller 220 and is transported to the medium supplying unit 216a along the upper face of the unwinding table 219.

The winding unit 215 is provided with a winding frame 241 and a relay roller 242 and a winding drive axis 243 that are disposed in the winding frame 241. The sheet S that is discharged from the medium discharging unit 216b is guided to the winding drive axis 243 after being wound onto the relay roller 242 and is wound into a roll by the rotational drive of the winding drive axis 243.

A plate-shaped base table 221 is horizontally installed in the main body case 216 of the main body unit 214. The base table 221 divides the inside of the main body case 216 into two spaces. The upper side space configured by the base table 221 is a printing chamber 222 where printing is performed on the sheet S. Disposed in the printing chamber 222 are a platen (medium supporting unit) 228, a recording head (recording processing unit) 236, a carriage 235a, two guide axes 235, a valve unit 237, and the laser scanner apparatus 7. The platen 228 is fixed onto the base table 221. The recording head 236 is disposed above the platen 228. The carriage 235a supports the recording head 236. The two guide axes 235 support the carriage 235a. The laser scanner apparatus 7 clips the sheet S. The two guide axes 235 are arranged parallel to each other along the transport direction (Y direction), and the carriage 235a is configured to be capable of reciprocating in the transport direction.

The platen 228 includes a supporting table 228a and a mounting plate 228b. The supporting table 228a has a shape of a box of which the upper face is open. The mounting plate 228b is installed in the opening of the supporting table 228a. The supporting table 228a is fixed onto the base table 221. The inside of the space surrounded by the supporting table 228a and the mounting plate 228b is a negative pressure chamber. The sheet S is mounted on a supporting face of the mounting plate 228b (a medium supporting face that is the upper face of the mounting plate 228b in the +X-axis direction of FIG. 9).

Multiple suction holes (not illustrated) that pass through the mounting plate 228b in the thickness-wise direction of the mounting plate 228b are formed in the mounting plate 228b. An air exhausting port (not illustrated) that passes through one side wall of the supporting table 228a (the side wall on the −Y side in the present embodiment) is formed in the side wall. An unillustrated suction fan is connected to the air exhausting hole. The suction of the suction fan can exert a suction force on the sheet S through the multiple suction holes and can cause the sheet S to be flat by attaching the sheet S with suction to the supporting face of the mounting plate 228b.

A supply transport system that includes a plurality of transport rollers is disposed on the upstream side (−Y side) of the transport direction of the platen 228. The supply transport system includes a pair of first transport rollers 225, a relay roller 224, and a relay roller 223. The pair of first transport rollers 225 is disposed in the printing chamber 222 near the platen 228. The relay roller 224 is disposed in the lower side space of the main body case 216. The relay roller 223 is disposed near the medium supplying unit 216a.

The pair of first transport rollers 225 is configured of a first driving roller 225a and a first driven roller 225b.

In the supply transport system, the sheet S that is transported into the main body case 216 from the unwinding unit 213 through the medium supplying unit 216a is wound onto the first drive roller 225a from below via the relay rollers 223 and 224 and is nipped by the pair of first transport rollers 225. Then, the sheet S is horizontally unwound onto the supporting face of the platen 228 from the pair of first transport rollers 225 along with the rotation of the first driving roller 225a that is driven by a first transport motor (not illustrated).

Meanwhile, a discharge transport system that includes a plurality of transport rollers is disposed on the downstream side (+Y side) of the transport direction of the platen 228. The discharge transport system includes a pair of second transport rollers 233, an inverting roller 238, a relay roller 239, and a delivery roller 240. The pair of second transport rollers 233 is disposed on the opposite side of the platen 228 from the pair of first transport rollers 225. The inverting roller 238 and the relay roller 239 are disposed in the lower side space of the main body case 216. The delivery roller 240 is disposed near the medium discharging unit 216b.

The pair of second transport rollers 233 is configured of a second driving roller 233a and a second driven roller 233b. The second driven roller 233b, since being arranged on the printing face side (upper face side) of the sheet S, may be configured to abut only the widthwise (X-directional) edge portion of the sheet S so as to avoid damage to the image printed.

In the discharge transport system, the pair of second transport rollers 233 that nips the sheet S transports the sheet S out of the platen 228 along with the rotation of the second driving roller 233a that is driven by a second transport motor (not illustrated). The sheet S that is unwound from the pair of second transport rollers 233 is transported to the delivery roller 240 via the inverting roller 238 and the relay roller 239 and is unwound by the delivery roller 240 to the winding unit 215 through the medium discharging unit 216b.

In the present embodiment, the plurality of recording heads 236 is installed on the carriage 235a through a head installation plate (not illustrated). The head installation plate is configured to be movable in the widthwise direction of the medium (X direction) on the carriage 235a. The position of the head installation plate can be controlled. By moving the head installation plate in the widthwise direction of the medium (X direction), line feed can be integrally performed for the plurality of recording heads 236. The recording heads 236 are arranged in a line at certain intervals in the widthwise direction of the medium such that the adjacent recording heads 236 form two different stages in the transport direction of the medium (Y direction) on the head installation plate.

Each of the plurality of recording heads 236 is connected to the valve unit 237 through an unillustrated ink supply tube. The valve unit 237 is disposed in the inner wall of the main body case 216 in the printing chamber 222 and is connected to an unillustrated ink tank (ink retaining unit). The valve unit 237 supplies ink to the recording heads 236 while temporarily retaining the ink that is supplied from the ink tank.

Multiple ink discharging nozzles are arranged in an array in the widthwise direction of the medium (X direction) on the lower face (nozzle formation face) of the recording heads 236. The recording heads 236 performs printing by ejecting the ink which is supplied from the valve unit 237 to the sheet S on the platen 228 from the ink discharging nozzles. The recording heads 236 may include a plurality of ink discharging nozzle arrays. In this case, when four-color or six-color printing is performed, one recording head 236 can eject a plurality of color inks if color inks are respectively assigned to the ink discharging nozzle arrays.

The laser scanner apparatus 7 is provided in the main body case 216 of the main body unit 214. The laser scanner apparatus 7 is disposed on the further downstream side (Y side) than the above position where ink is ejected. The laser scanner apparatus 7 is disposed to partially clip or divide the sheet S on which an image is recorded. The laser scanner apparatus 7 has the same configuration as the above configuration (refer to FIG. 6) and will not be described in detail.

The sheet S that is a working matter is irradiated with laser light that is oscillated by the laser oscillator 401 of the laser scanner apparatus 7 and that passes through the first lens 403, the first mirror 407, and the second mirror 409, and the like. The position of the first lens 403 is controlled by the drive control system 1A, and the positions of rotation (angles) of the first mirror 407 and the second mirror 409 are controlled by the drive control systems 1B and 1C. As such, a desired position on the sheet S can be irradiated with laser light LA with which the sheet S is irradiated by controlling the position of irradiation with each of the drive control systems 1A, 1B, and 1C. A part of the sheet S irradiated with the laser light LA is fused, and the sheet S is partially clipped or divided.

The part that is clipped or divided by the laser light LA after being fused may be discharged by an unillustrated discharging unit to a depository unit and be deposited therein or may be transported to the winding unit 215 while being held on the base material by the adhesive of the sheet S.

While the present configuration is described in an example where the sheet S after an image is recorded thereon by the ejection of ink is clipped or divided by fusing that uses the laser scanner apparatus 7, the configuration is not limited to the example. A desired position on the sheet S may be clipped or divided before an image is recorded on the sheet S.

According to the above printer (recording apparatus) 211, the position of rotation (angle of rotation) of the motor M can be controlled with high accuracy in the drive control systems 1A, 1B, and 1C that are used to control the position irradiated with the laser light LA. Therefore, the printer (recording apparatus) 211 can clip or divide the sheet S with high positional accuracy.

While the control device for a motor, the control method, the electronic apparatus, and the recording apparatus are described herebefore on the basis of the embodiment illustrated, the invention is not limited to the embodiment. The configuration of each unit can be substituted by an arbitrary configuration that has the same function. In addition, other arbitrary constituents may be added to the invention.

Modification Example (1) While the configuration in which the center voltage $V_{AC}$ of the first detected signal $S_A$ and the center voltage $V_{BC}$ of the second detected signal $S_B$ are measured for each drive control system 1 and are stored on the storage unit 25 before shipment is exemplified in the above embodiment, the method for obtaining the center voltage $V_{AC}$ and the center voltage $V_{BC}$ is not limited to the above exemplification. For example, a configuration in which the center voltage $V_{AC}$ of the first detected signal $S_A$ and the center voltage $V_{BC}$ of the second detected signal $S_B$ are measured and stored on the storage unit 25 by rotating the motor M when the drive control system 1 starts operating may also be preferably used.

(2) While the configuration in which the difference-sum ratio index W is computed by using Equation (2) is exemplified in the above embodiment, the method for computing the difference-sum ratio index W is not limited to the above exemplification. For example, a configuration in which the difference-sum ratio index W is computed by multiplying the ratio $(|\Delta V_A|-|\Delta V_B|)/(|\Delta V_A|+|\Delta V_B|)$ of the difference value between the absolute value $|\Delta V_A|$ of the first difference $\Delta V_A$ and the absolute value $|\Delta V_B|$ of the second difference $\Delta V_B$ to the sum of both thereof by a predetermined integer or a configuration in which the difference-sum ratio index W is computed by a predetermined operation in which the ratio is a variable may also be used. As understood from the above description, the ratio computing unit 24 is comprehensively represented as an element that computes the difference-sum ratio index W (an example of a ratio) which is in accordance with the ratio of the difference value between the absolute value $|\Delta V_A|$ of the first difference $\Delta V_A$ and the absolute value $|\Delta V_B|$ of the second difference $\Delta V_B$ to the sum of the absolute value $|\Delta V_A|$ of the first difference $\Delta V_A$ and the absolute value $|\Delta V_B|$ of the second difference $\Delta V_B$.

(3) While the configuration in which the voltage signal (the first detected signal $S_A$ and the second detected signal $S_B$) that is in accordance with the amount of light received is output by using the optical rotary encoder 10 that includes the light-emitting unit 12 and the light-receiving unit 18 is exemplified in the above embodiment, the configuration for generating the first detected signal $S_A$ and the second detected signal $S_B$ that have a phase difference is not limited to the above exemplification. For example, a configuration in which the first detected signal $S_A$ and the second detected signal $S_B$ are generated by using a resolver detector may be used.

The entire disclosure of Japanese Patent Application No. 2014-218045, filed Oct. 27, 2014 and No. 2015-131531, filed Jun. 30, 2015 are expressly incorporated by reference herein.

What is claimed is:

1. A position detecting device that detects the position of a moving body by using a first detected signal and a second detected signal that have voltage values changing in connection with a movement of the moving body and have a phase difference, the device comprising:
   a difference computing unit that computes a first value and a second value, the first value being the difference value between a center voltage of the first detected signal and the voltage value of the first detected signal, and the second value being the difference value between a center voltage of the second detected signal and the voltage value of the second detected signal;
   a ratio computing unit that computes the ratio of the difference value between the absolute value of the first value and the absolute value of the second value to the sum of the absolute value of the first value and the absolute value of the second value; and
   a position specifying unit that specifies the position of the moving body by using the ratio.

2. The position detecting device according to claim 1, further comprising:
   a determining unit that determines the sign of each of the first value and the second value,
   wherein the position specifying unit specifies the position of the moving body by using a combination of the signs of the first value and the second value and by using the ratio.

3. The position detecting device according to claim 1, further comprising:
   a storage unit that includes correspondence information between the position of the moving body and the ratio,
   wherein the position specifying unit specifies the position of the moving body by using the ratio and the correspondence information.

4. An electronic apparatus comprising:
   a motor that includes a rotating moving body; and
   the position detecting device according to claim 1 that detects the position of rotation of the moving body.

5. A recording apparatus comprising:
   a motor that includes a moving body which rotates by the supply of a drive signal; and
   the position detecting device according to claim 1 that detects the position of rotation of the moving body.

6. A robot comprising:
   a motor that includes a moving body which rotates by the supply of a drive signal; and the position detecting device according to claim 1 that detects the position of rotation of the moving body.

7. A position detecting method that detects the position of a moving body by using a first detected signal and a second detected signal that have voltage values changing in connection with a movement of the moving body and have a phase difference, the method comprising:

computing a first value and a second value, the first value being the difference value between a center voltage of the first detected signal and the voltage value of the first detected signal, and the second value being the difference value between a center voltage of the second detected signal and the voltage value of the second detected signal;

computing the ratio of the difference value between the absolute value of the first value and the absolute value of the second value to the sum of the absolute value of the first value and the absolute value of the second value; and specifying the position of the moving body by using the ratio.

* * * * *